US010802998B2

(12) United States Patent
Kotary et al.

(10) Patent No.: US 10,802,998 B2
(45) Date of Patent: Oct. 13, 2020

(54) TECHNOLOGIES FOR PROCESSOR CORE SOFT-OFFLINING

(71) Applicant: Intel Corporation, Santa Clara, CA (US)

(72) Inventors: Karunakara Kotary, Portland, OR (US); Gaurav Khanna, Hillsboro, OR (US); Abhinav R. Karhu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 15/083,961

(22) Filed: Mar. 29, 2016

(65) Prior Publication Data

US 2017/0286332 A1 Oct. 5, 2017

(51) Int. Cl.
*G06F 13/24* (2006.01)
*G06F 9/4401* (2018.01)

(52) U.S. Cl.
CPC ............ *G06F 13/24* (2013.01); *G06F 9/4401* (2013.01); *Y02D 10/14* (2018.01)

(58) Field of Classification Search
CPC ....... G06F 13/24; G06F 9/4401; G06F 9/4812
USPC ............. 710/15, 18, 48, 260, 262, 266, 269; 712/244
See application file for complete search history.

(56) References Cited

U.S. PATENT DOCUMENTS 3,665,404 A * 5/1972 Werner ................... G06F 13/26 710/262
6,189,065 B1 * 2/2001 Arndt .................... G06F 9/4812 710/260
6,418,517 B1 * 7/2002 McKenney ........... G06F 9/4825 707/999.104
6,463,492 B1 * 10/2002 Engfer .................. G06F 9/4812 710/260
10,311,014 B2 * 6/2019 Dalton ................ H04L 43/0876
2004/0019723 A1 * 1/2004 Ostrovsky ............... G06F 13/24 710/260
2005/0246466 A1 * 11/2005 Wright .................... G06F 13/24 710/260
2006/0294149 A1 * 12/2006 Seshadri ............. G06F 12/0646
2007/0288646 A1 * 12/2007 Imamura ................. G06F 15/16 709/230

(Continued)

*Primary Examiner* — Farley Abad
*Assistant Examiner* — Henry W Yu
(74) *Attorney, Agent, or Firm* — Barnes & Thornburg LLP

(57) ABSTRACT

Technologies for processor core soft-offlining include a computing device having a processor with multiple processor cores. On boot, an operating system queries a firmware interface to retrieve a potential offline set of processor cores. The operating system prevents the processor cores of the potential offline set from receiving device interrupts. The computing device detects a platform management event from the firmware interface and, in response to the platform management event, queries the firmware interface to determine a requested offline set of processor cores. Each of the processor cores in the requested offline set is included in the potential offline set. The computing device brings the processor cores of the requested offline set into a low-power state, and then the computing device may start performing a platform management operation. The platform management event may include a memory hot-plug event or a specialized workload event. Other embodiments are described and claimed.

25 Claims, 4 Drawing Sheets

400
BOOT OPERATING SYSTEM 402
QUERY FIRMWARE INTERFACE TO RETRIEVE POTENTIAL OFFLINE SET OF CORES 404
PREVENT CORES IN POTENTIAL OFFLINE SET FROM RECEIVING DEVICE INTERRUPTS 406
STORE CORES IN POTENTIAL OFFLINE SET IN BITMAP FOR RUNTIME USE 408
A
MONITOR FOR PLATFORM MANAGEMENT EVENT FROM FIRMWARE INTERFACE 410
MONITOR FOR MEMORY HOT-PLUG EVENT 412
MONITOR FOR SPECIALIZED WORKLOAD EVENT 414
EVENT? 416
NO
YES
QUERY FIRMWARE INTERFACE TO DETERMINE REQUESTED OFFLINE SET OF CORE(S) 418
RE-ASSIGN THREADS FROM CORE(S) IN REQUESTED OFFLINE SET 420
BRING CORE(S) IN REQUESTED OFFLINE SET INTO LOW-POWER STATE 422
PREVENT INTERRUPTS TO CORE(S) IN REQUESTED OFFLINE SET 424
NOTIFY FIRMWARE INTERFACE WITH LIST OF CORE(S) THAT HAVE BEEN OFFLINED 426
B

(56) References Cited

U.S. PATENT DOCUMENTS

2008/0201500 A1* 8/2008 Zytaruk ................ G06F 9/4825 710/48
2011/0153893 A1* 6/2011 Foong .................. G06F 9/4812 710/268
2012/0144081 A1* 6/2012 Smith .................. G06F 9/4812 710/269
2012/0144172 A1* 6/2012 de Cesare .............. G06F 13/24 712/244
2012/0174097 A1* 7/2012 Levin .................. G06F 9/5077 718/1
2013/0318334 A1* 11/2013 Waskiewicz, Jr. .... G06F 9/3861 712/244
2014/0198653 A1* 7/2014 Dalal .................. G06F 13/16 370/235
2016/0170470 A1* 6/2016 Kannan ................ G06F 1/3234 713/324
2016/0335183 A1* 11/2016 McKenney ......... G06F 12/0833

* cited by examiner

TECHNOLOGIES FOR PROCESSOR CORE SOFT-OFFLINING

BACKGROUND

Current microprocessors may include multiple processor cores as well as other computing resources such as graphics processors, co-processors, or other specific workload accelerators in a single package. For these highly integrated systems, power consumption and thermal efficiency are increasingly important factors. Certain microprocessors may allow one or more of the processor cores to be powered down or otherwise quiesced to reduce power consumption and/or thermal load.

Certain processors provide a special operating mode called system management mode ("SMM") for handling certain interrupts generated by hardware components of the computer platform, called system management interrupts ("SMIs"). Upon detecting an SMI, such a processor suspends execution by saving its current state and then entering SMM. Once in SMM, the processor executes SMI handler code. Such SMI handler code may perform tasks such as error handling, power management, device hot plug management, or other platform management tasks. Upon completion, the SMI handler code executes a resume instruction (e.g., "RSM"), causing the processor to reload its saved state and resume execution in the previous operating mode. Receiving the SMI, entering SMM, and the operation of the SMI handler are thus transparent to other code executing on the processor, including operating system code.

Many modern operating systems impose time limits on the duration that a processor may be held invisible from the operating system, which may cause the processor to make frequent context switches between SMM and the operating system. In those systems, the SMI handler may only have a small time quantum (e.g., on the order of 40-50 microseconds) to work before relinquishing control to the operating system. Due to the time limit and the context switch overhead, performing platform management functions such as memory hot plug management using SMM may take multiple hours to complete. To improve platform management performance, certain systems may reserve entire processor cores for SMM, making those processor cores unavailable to execute application programs under the operating system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
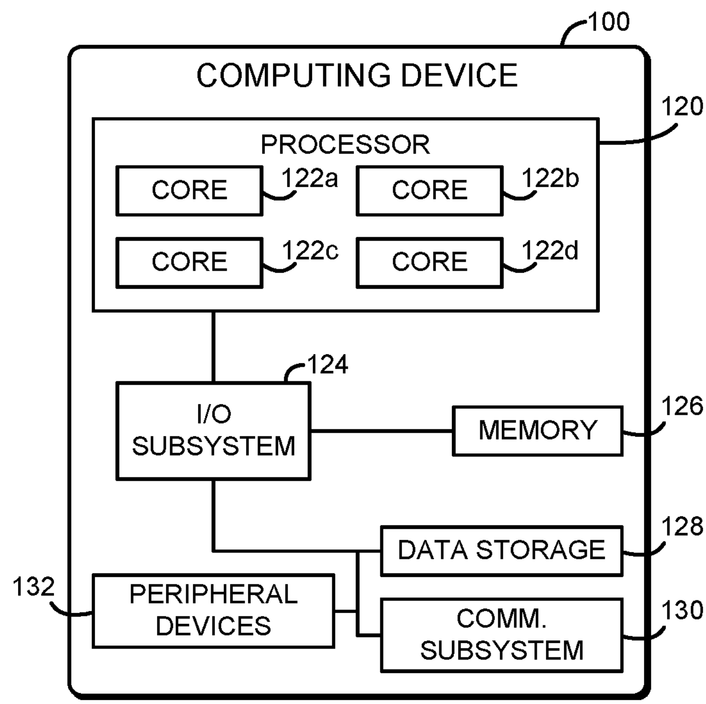
FIG. 1 is a simplified block diagram of at least one embodiment of a computing device for processor core soft-offlining.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for mutual application isolation includes a processor 120 that includes multiple processor cores 122. In use, as described further below, the computing device 100 boots an operating system and the operating system queries the platform firmware for a list of processor cores 122 that may be brought offline (the potential offline set). At runtime, in response to a platform management event, the operating system queries the firmware for a list of processor cores 122 to bring offline (the requested offline set). The operating system suppresses device interrupts for the requested offline set, reassigns threads executing on processor cores 122 in the requested offline set, and then brings the requested offline set of processor cores 122 into a low-power state. The computing device 100 then performs a platform management operation with the processor cores 122 offline. Thus, the computing device 100 may reduce power consumption and/or thermal load during the platform management operation, because the offline processor cores 122 may not be brought online to execute threads or to handle device interrupts or other events. The reduced power consumption and/or additional thermal headroom may allow non-core resources of the processor 120 to execute at full power. Additionally or alternatively, the processor cores 122 in the requested offline set may be brought into system management mode (SMM), and may remain in SMM until the management task is completed. In such embodiments, processing a memory hotplug event in SMM may be completed in three to four minutes, as opposed to requiring several hours to process the memory hotplug event when the processor cores 122 transition repeatedly between SMM and being under operating system control. Additionally, in such embodiments the computing device 100 may not be required to reserve an entire processor core 122 for SMM, which may improve operating system performance.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 124, a memory 126, a data storage device 128, and communication circuitry 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The illustrative processor 120 is a quad-core processor 120 having four processor cores 122, each of which is an independent processing unit capable of executing programmed instructions. It should be understood that in other embodiments the processor 120 may be embodied as a multi-core processor, digital signal processor, microcontroller, or other processor or processing/controlling circuit with multiple processor cores. The processor 120 may also include other, non-core computing resources such as shared cache memory, processor graphics, memory controllers, I/O circuitry, power management circuitry, microcontrollers and/or field-programmable gate arrays (FPGAs) for specialized workloads, or other computing resources. Parts of the processor 120 not included in a processor core 122 may be known as the uncore of the processor 120.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication circuitry 130 of the computing device 100 may be embodied as any communication circuit, device, or collection thereof, capable of enabling communications between the computing device 100 and other remote devices over a network. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
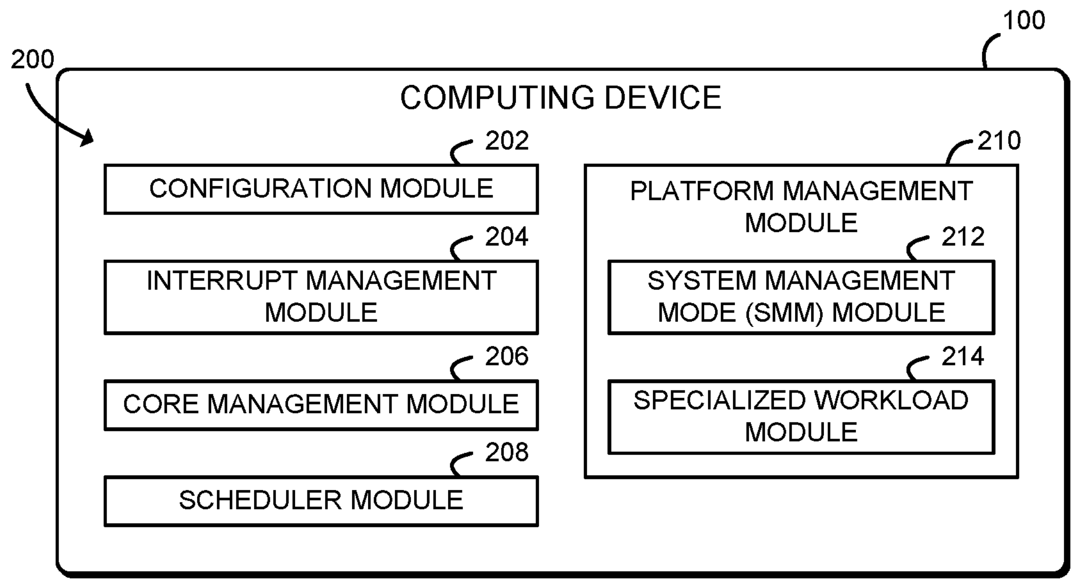
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a configuration module 202, an interrupt management module 204, a core management module 206, a scheduler module 208, and a platform management module 210. The various modules of the environment 200 may be embodied as hardware, firmware, software, or a combination thereof. As such, in some embodiments, one or more of the modules of the environment 200 may be embodied as circuitry or collection of electrical devices (e.g., configuration circuitry 202, interrupt management circuitry 204, core management circuitry 206, scheduler circuitry 208, and/or platform management circuitry 210). It should be appreciated that, in such embodiments, one or more of the configuration circuitry 202, the interrupt management circuitry 204, the core management circuitry 206, the scheduler circuitry 208, and/or the platform management circuitry 210 may form a portion of one or more of the processor 120, the I/O subsystem 124, and/or other components of the computing device 100. Additionally, in some embodiments, one or more of the illustrative modules may form a portion of another module and/or one or more of the illustrative modules may be independent of one another.

The configuration module 202 is configured to query a firmware interface of the computing device 100 to retrieve a potential offline set of processor cores 122 of the computing device 100. As described further below, each of the processor cores 122 identified in the potential offline set is a potential target for soft-offlining at runtime in response to a platform management event. The interrupt management module 204 is configured to prevent receipt of device interrupts by the processor cores 122 of the potential offline set.

The core management module 206 is configured to detect a platform management event from the firmware interface and query the firmware interface to determine a requested offline set of processor cores 122 to bring offline in response to detection of the platform management event. The requested offline set of processor cores 122 is included in the potential offline set of processor cores 122 previously retrieved from the firmware interface. Thus, the requested offline set of processor cores 122 was prevented from receiving device interrupts prior to detection of the platform management event. The platform management event may include a memory hot-plug event or a specialized workload event.

The scheduler module 208 is configured to re-assign any threads from the requested offline set of processor cores 122 to one or more other processor cores 122 that are not in the requested offline set. The core management module 206 may be further configured to bring the requested offline set of processor cores 122 into a low-power state in response to threads being re-assigned. The interrupt management module 204 may be further configured to prevent interrupts to the requested offline set of processor cores 122 in response to bringing the requested offline set of processor cores 122 into the low-power state. The core management module 206 may be further configured to notify the firmware interface with the requested offline set of processor cores 122 in response to bringing the requested offline set of processor cores 122 into the low-power state.

The platform management module 210 is configured to perform a platform management operation in response to the firmware interface being notified with the requested offline set of processor cores 122, after the requested offline set of processor cores 122 are brought into the low-power state. The platform management operation may include each processor core 122 of the requested offline set entering a system management mode (SMM). Additionally or alternatively, the platform management operation may include performing a specialized workload while the requested offline set of processor cores 122 are in the low-power state. Performing the specialized workload may include activating a non-core resource of the processor 120 such as a specialized microcontroller or FPGA. In some embodiments, those functions may be performed by one or more sub-modules, such as an SMM module 212 and/or a specialized workload module 214.

The core management module 206 may be further configured to notify an operating system, by the firmware interface, that the platform management operation is completed. The core management module 206 may be further configured to query the firmware interface to determine a requested online set of processor cores 122 to bring online in response to the notification. The requested online set is included in the potential offline set, and may be the same as the requested offline set. The core management module 206 may be further configured to bring the requested online set of processor cores 122 into a normal power state. The scheduler module 208 may be further configured to start assigning threads to the processor cores 122 of the requested online set of processor cores 122 in response to bringing the requested online set of processor cores 122 into the normal power state.

Figure 3:
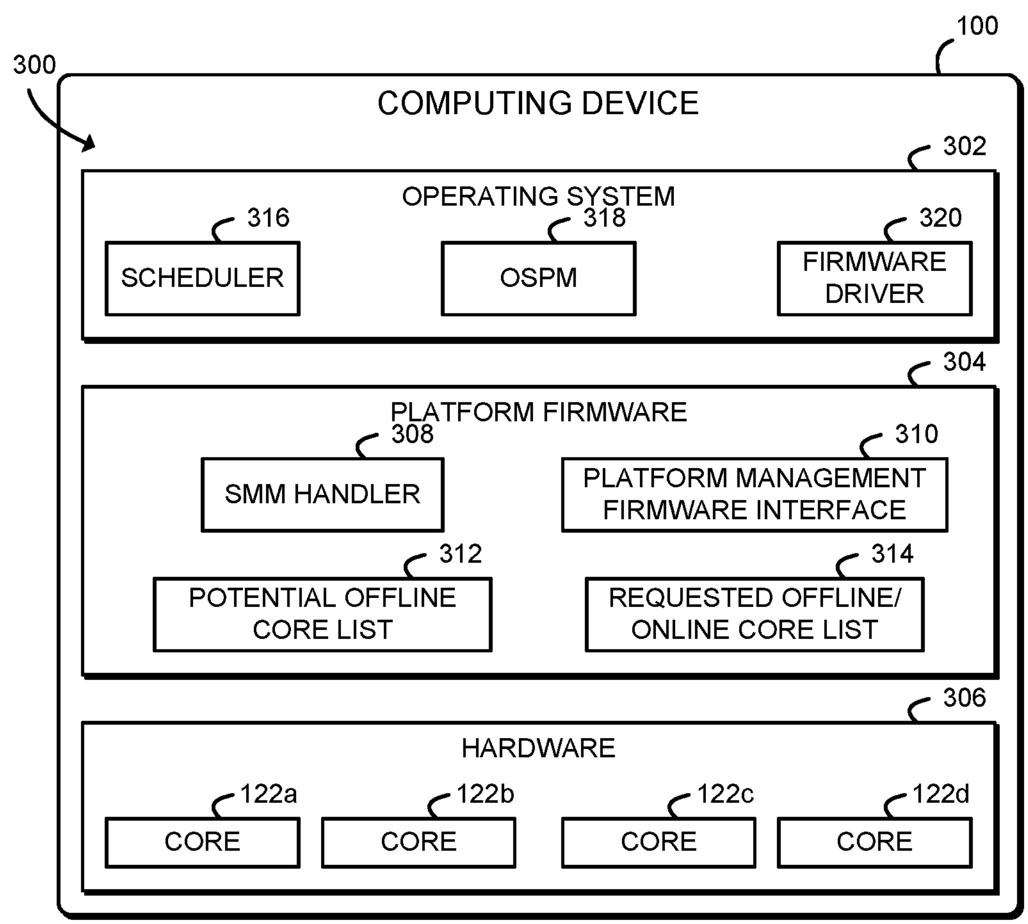
FIG. 3 is a simplified block diagram of at least one embodiment of a system architecture that may be established by the computing device of FIG. 1.

Referring now to FIG. 3, in an illustrative embodiment, the computing device 100 establishes a system architecture 300 during operation. The illustrative system architecture 300 includes an operating system 302, platform firmware 304, and hardware 306. The hardware 306 includes hardware components of the computing device 100, such as the processor cores **122*a* through 122*d* as shown. Of course, the hardware 306 may include other components of the computing device 100**.

The platform firmware 304 may be embodied as any pre-boot and/or runtime firmware environment of the computing device 100. The illustrative platform firmware 304 includes a system management mode (SMM) handler 308, a platform management firmware interface 310, a potential offline core list 312, and a requested offline/online core list 314. The SMM handler 308 may be embodied as an event handler or other routine executed by one or more of the processor cores 122 in response to a system management interrupt (SMI). Before executing the SMM handler 308, the associated processor core 122 saves its current context and switches to SMM. After executing the SMM handler 308, the processor core 122 resumes its saved context and switches back to the previous operating mode. Thus, the SMM handler 308 may execute independently of and transparently to the operating system 302. The SMM handler 308 may perform platform management operations include power management operations; reliability, availability, and serviceability (RAS) operations; memory hot-plug management, and other platform management features.

The platform management firmware interface 310 provides a programmatic interface between the operating system 302 and the platform firmware 304. In the illustrative embodiment, the platform management firmware interface 310 is a firmware interface as described by the Advanced Configuration and Power Interface (ACPI) specification. The firmware interface 310 establishes a hierarchical namespace of objects that describe ACPI devices and other hardware components of the computing device 100. Each of the objects of the namespace may be embodied as an ACPI control method, which may include a set of declarations and/or instructions written in the ACPI source language (ASL) that is compiled into ACPI machine language (AML). AML may be embodied as a collection of bytecode for a virtual machine that may be interpreted by the computing device 100 (for example by the operating system 302). The AML for the firmware control method may be loaded into one or more ACPI tables stored in the memory 126. As described further below, the platform management firmware interface 310 may be used to identify processor cores 122 to be brought offline.

The potential offline core list 312 identifies processor cores 122 of the processor 120 that may potentially be brought offline at runtime. The potential offline core list 312 may be preconfigured or may be determined by the platform firmware 304 on demand. As described further below, the operating system 302 queries the platform management firmware interface 310 for the potential offline core list 312 during boot. Similarly, the requested offline/online core list 314 identifies processor cores 122 of the processor 120 that the platform firmware 304 requests to be brought offline or back online at runtime. As described further below, the operating system 302 may query the platform management firmware interface 310 for the requested offline/online core list 314 at runtime.

The operating system 302 may be embodied as any operating system, hypervisor, virtual machine monitor, or other software control structure of the computing device 100. The illustrative operating system 302 includes a scheduler 316, an operating system power management (OSPM) component 318, and a firmware driver 320. The scheduler 316 may be embodied as a kernel module or other component of the operating system 302 that schedules processes and/or threads for execution by the processor cores 122. In some embodiments, the scheduler 316 may be capable of binding a thread to a particular processor core 122, for example by setting operating system processor affinity for that thread. The OSPM 318 may be embodied as a kernel module or other component of the operating system 302 that performs power management tasks. For example, the OSPM 318 may bring the processor cores 122 or other components of the computing device 100 into one or more power states (e.g., a processor power state such as an ACPI C-state, a system power state such as an ACPI S-state, or other power state). The firmware driver 320 may be embodied as any kernel module or other component that interacts with the firmware interface 310 established by the platform firmware 304. In the illustrative embodiment, the firmware driver 320 may be embodied as an ACPI driver and may be capable of parsing and otherwise traversing ACPI tables established by the firmware interface 310. In some embodiments, the firmware driver 320 may include an AML interpreter that may be used to evaluate firmware objects of the firmware interface 310.

Figure 4A:
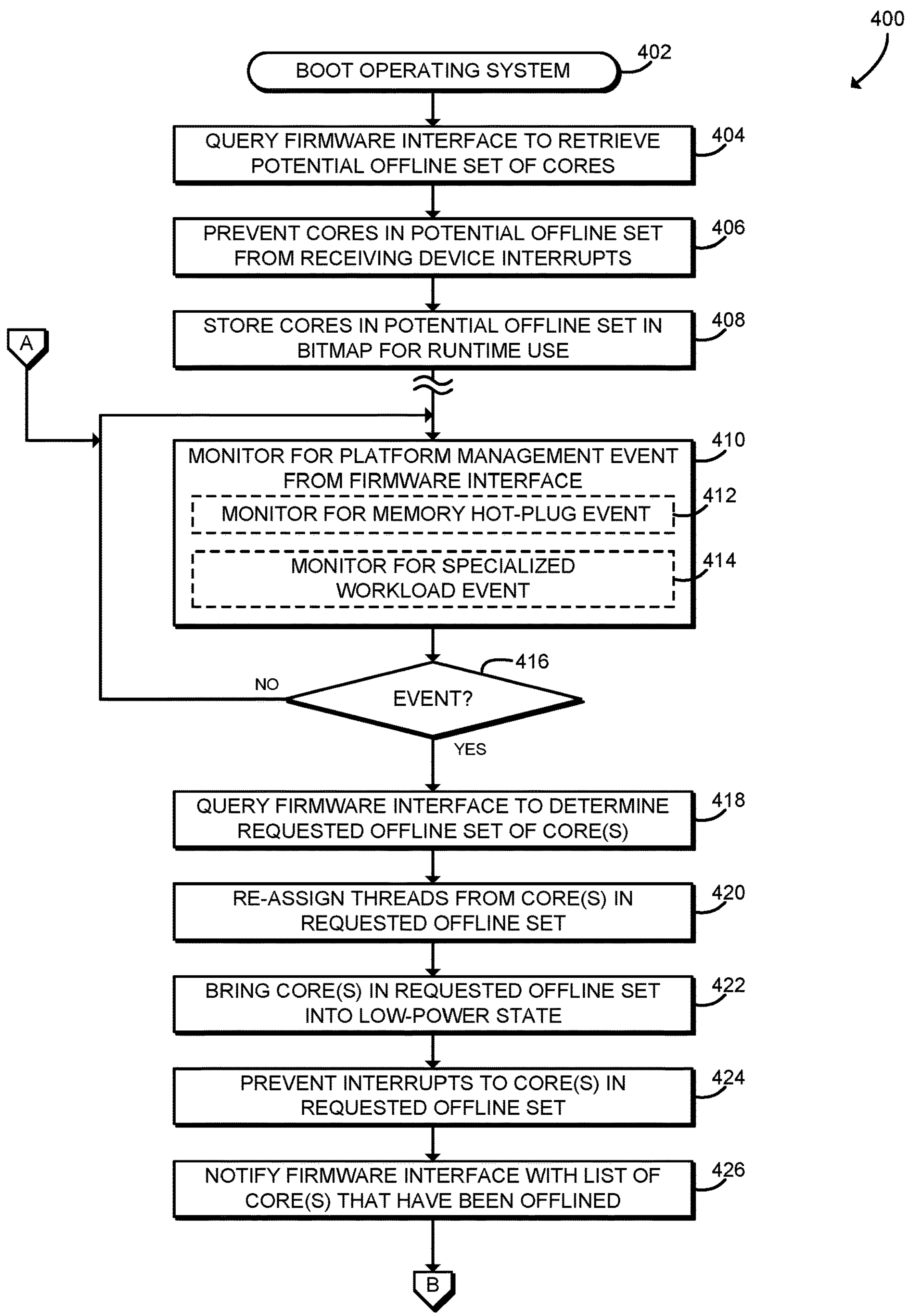
FIGS. 4A and 4B are a simplified flow diagram of at least one embodiment of a method for processor core soft-offlining and onlining that may be executed by the computing device of FIGS. 1-2.
Figure 4B:
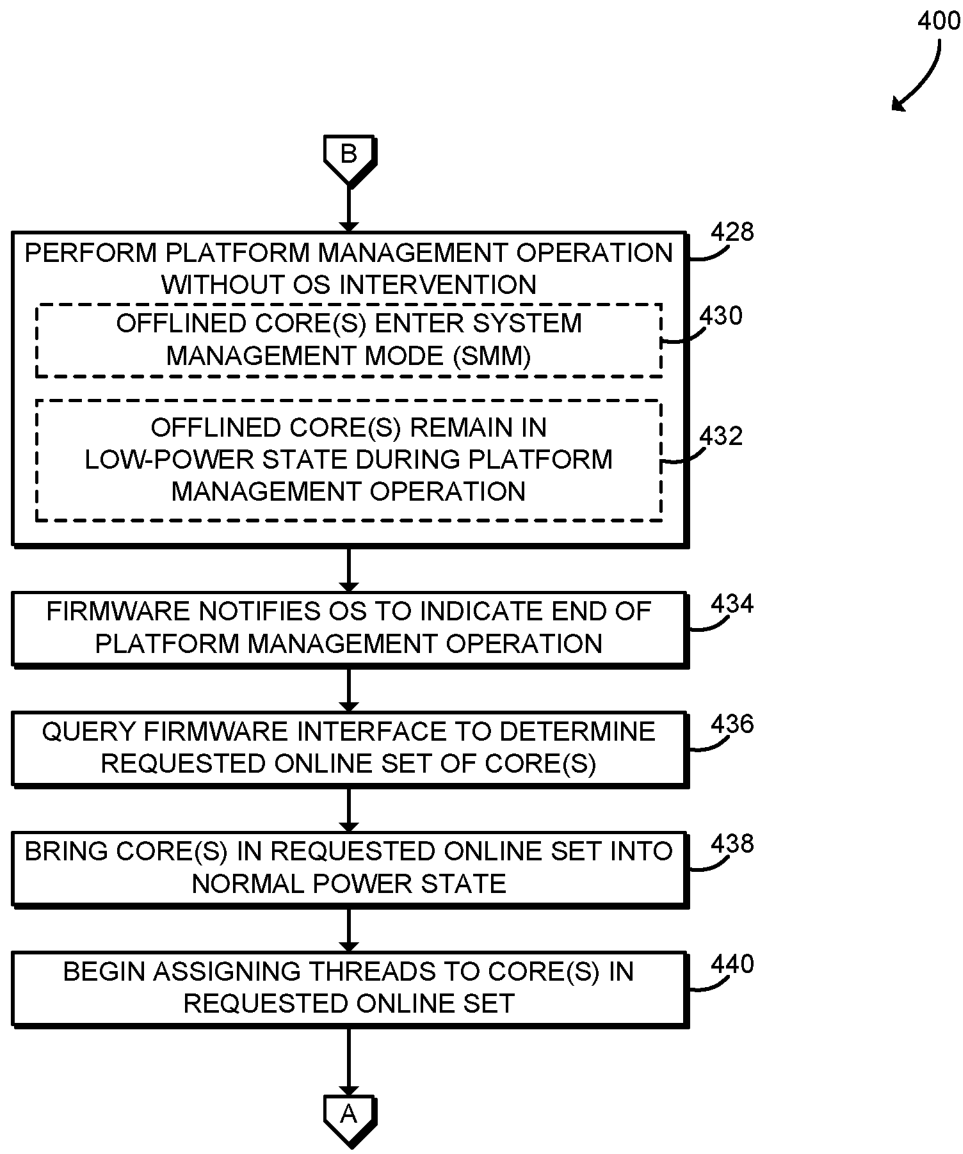

Referring now to FIGS. 4A and 4B, in use, the computing device 100 may execute a method 400 for processor core 122 soft-offlining. The method 400 begins in block 402, in which the computing device 100 boots into the operating system 302. The computing device 100 may boot into the operating system 302 in response to a power cycle, platform reset, or other initialization event.

In block 404, the computing device 100 queries the platform management firmware interface 310 to a potential offline set of processor cores 122. The potential offline set identifies the particular processor cores 122 of the processor 120 that may be offlined. The potential offline set may be embodied as, for example, a bitmap or other data structure that identifies whether or not each processor core 122 of the computing device 100 may be offlined.

To retrieve the potential offline set, the operating system 302 may evaluate an ACPI object provided by the firmware interface 310. As described above, in the illustrative embodiment the firmware interface 310 is a firmware interface that complies with the Advanced Configuration and Power Interface (ACPI) specification. The firmware interface 310 establishes a hierarchical namespace of objects that describe ACPI devices and other hardware components of the computing device 100. Thus, to retrieve the potential offline set of processor cores 122, the operating system 302 may traverse the namespace and evaluate an appropriate object, such as an object declared under the processor aggregator device (e.g., under device plug and play ID ACPI000C). To evaluate that object, the operating system 302 (and/or the firmware driver 320) may look up the appropriate AML stored in the ACPI tables, and then interpret the AML code. In response to interpreting the AML code, the firmware interface returns the potential offline set of processor cores 122, for example by returning the potential offline core list 312.

In block 406, the computing device 100 prevents the processor cores 122 of the potential offline set from receiving device interrupts. The computing device 100 may use any technique to ensure that the processor cores 122 of the potential offline set are not assigned to receive device interrupts. For example, the operating system 302 may exclude the potential offline set of processor cores 122 from an interrupt affinity mask for device interrupts. At runtime, the operating system 302 will not assign device interrupts to any of the processor cores 122 of the potential offline set. In block 408, the computing device 100 stores a bitmap of the potential offline set of processor cores 122. After storing the potential offline set of processor cores 122, the operating system 302 may continue booting and then initiate runtime operations.

In block 410, the computing device 100 monitors for a platform management event received from the firmware interface 310. The computing device 100 may monitor for any platform management event that indicates that one or more of the processor cores 122 should be brought offline. In particular, the firmware interface 310 may generate the platform management event based on the state of platform firmware 304 and/or platform hardware. To signal the operating system 302, the firmware interface 310 may generate an ACPI event as described in the ACPI specification. In particular, the firmware interface 310 may trigger a system control interrupt (SCI), which is handled by the OSPM 318. The OSPM 318 may handle the platform management event or may dispatch the event to an appropriate ACPI object or control method of the firmware interface 310. As described above, the platform management event indicates that one or more of the processor cores 122 should be brought offline. In some embodiments, in block 412 the computing device 100 may monitor for a memory hot-plug event. In some embodiments, in block 414 the computing device 100 monitors for a specialized workload event. For example, the computing device 100 may determine whether one or more non-core processing resources of the computing device 100 (e.g., a microcontroller and/or FPGA) are actively processing a specialized workload or are scheduled to process a specialized workload.

In block 416, the computing device 100 determines whether a platform management event was detected. If not, the method 400 loops back to block 410 to continue monitoring for platform management events. If a platform management event was detected, the method 400 advances to block 418.

In block 418, the computing device 100 queries the firmware interface 310 to determine a requested offline set of processor cores 122, which identifies the processor cores 122 to bring offline. The requested offline set of processor cores 122 are selected from the potential offline set of processor cores 122 previously retrieved from the firmware interface 310 as described above in connection with block 404. As an illustrative example, if the processor cores 122*a*, 122*b* are included in the potential offline set, then the requested offline set may include the processor core 122*a*, the processor core 122*b*, and/or both processor cores 122*a*, 122*b*. To retrieve the requested offline set of processor cores 122, the operating system 302 may traverse the firmware namespace established by the firmware interface 310 and evaluate an appropriate object, such as an object declared under the processor aggregator object. In response to evaluating the firmware object (e.g. in response to interpreting an associated ACPI control method), the platform firmware 304 may identify the processor cores 122 in the requested offline set. The particular processor cores 122 to bring offline may depend on the platform management event. For example, for a platform management event that is processed by the processor cores 122 in SMM, the platform firmware 304 may determine the number of processor cores 122 required to efficiently process the SMM event. As another example, for a specialized workload event, the platform firmware 304 may determine the number of processor cores 122 that should be offlined to meet a particular power consumption or thermal envelope. The platform firmware 304 identifies the particular processor cores 122 to bring offline from within the potential offline set.

In block 420, the computing device 100 re-assigns any processes or threads that are being executed by the requested offline set of processor cores 122 to any of the remaining processor cores 122 of the computing device 100. For example, the scheduler 316 of the operating system 302 may re-assign operating system processes and/or threads from a processor core 122 within the requested offline set to any of the other processor cores 122 not in the requested offline set. The computing device 100 also stops assigning new threads to the processor cores 122 of the requested offline set. Thus, after re-assigning the threads, no more active processes should be executing on the processor cores 122 of the requested offline set.

In block 422, the computing device 100 brings the processor cores 122 of the requested offline set into a low-power state. For example, the OSPM 318 of the operating system 302 may command the processor cores 122 of the requested offline set into a low-power state. The particular low-power state may depend on the capabilities of the processor cores 122, the operating system 302, and/or the platform firmware 304. For example, the processor cores 122 may be brought into the deepest idle state supported by the processor cores 122, such as a reduced power processor state (e.g., an ACPI C-state such as C1, C2, etc.), a connected standby state, or other deep idle state.

In block 424, the computing device 100 prevents interrupts to the processor cores 122 of the requested offline set. As described above in connection with block 406, even before being included in the requested offline set, those processor cores 122 already do not receive device interrupts, because the operating system 302 does not assign device interrupts to processor cores 122 within the potential offline set. Additionally, after receiving the requested offline set, the operating system 302 prevents issuing other interrupts to the processor cores 122 in the requested offline set, such as inter-processor interrupts (IPIs), translation looksaside buffer (TLB) flushes, or other interrupts.

In block 426, the computing device 100 notifies the firmware interface 310 with a list of the processor cores 122 that have been brought offline. To notify the firmware interface 310, the operating system 302 may confirm that the requested offline set was brought offline or otherwise identify the processor cores 122 that have been brought offline to the firmware interface 310. The operating system 302 may traverse the firmware namespace established by the firmware interface 310 and evaluate an appropriate object to notify the firmware interface 310, for example by interpreting an appropriate firmware control method.

In block 428, shown in FIG. 4B, the computing device 100 performs the platform management operation without operating system 302 intervention. In other words, while the computing device 100 performs the platform management operation, the processor cores 122 of the requested offline set remain offline and do not process any operating-system-visible work (e.g., threads, interrupts, or other operations managed by the operating system 302). In some embodiments, in block 430, the processor cores 122 of the requested offline set may enter a system management mode (SMM) to perform the platform management operation. Upon entering SMM, the requested offline set of processor cores 122 begin executing the SMM handler 308. While executing the SMM handler 308, the processor cores 122 may perform tasks such as error handling, power management, device hot plug management, or other platform management tasks. While executing the SMM handler 308, the processor cores 122 may enter a normal power state (e.g., ACPI C0, ACPI S0, or other non-idle state). In some embodiments, in block 432 the requested offline set of processor cores 122 may remain in the low-power state during the platform management operation. For example, the computing device 100 may perform a specialized workload using non-core computing resources of the processor 120, and the requested offline set of processor cores 122 may remain in the low-power state to provide additional thermal or power headroom for the specialized workload.

After completing the platform management operation, in block 434 the platform firmware 304 notifies the operating system 302 to indicate the end of the platform management operation. For example, the firmware interface 310 may evaluate a notify operator to raise an event to the operating system 302. The notification may be processed by an event handler or other component of the operating system 302, such as the OSPM 318 and/or the firmware driver 320.

In block 436, the computing device 100 queries the firmware interface 310 to determine a requested online set of processor cores 122, which identifies the processor cores 122 to bring online. The requested online set of processor cores 122 are selected from the potential offline set of processor cores 122 previously retrieved from the firmware interface 310 as described above in connection with block 404. The requested online set of processor cores 122 may be the same as the set of processor cores 122 that were brought offline as described above in connection with block 418. As an illustrative example, if the processor cores 122*a*, 122*b* are included in the potential offline set, and the processor core 122*a* was brought offline in response to a platform management event, then the requested online set may include the processor core 122*a*. To retrieve the requested online set of processor cores 122, the operating system 302 may traverse the firmware namespace established by the firmware interface 310 and evaluate an appropriate object, such as an object declared under the processor aggregator object. In response to evaluating the firmware object (e.g. in response to interpreting an associated ACPI control method), the platform firmware 304 may identify the processor cores 122 in the requested online set.

In block 438, the computing device 100 brings the processor cores 122 in the requested online set into a normal power state. For example, the OSPM 318 of the operating system 302 may command the affected processor cores 122 into a normal full-power state. The particular power state may depend on the capabilities of the processor cores 122, the operating system 302, and/or the platform firmware 304. For example, the processor cores 122 of the requested online set may be brought into a full-power state such as the ACPI C0 active processor state or other non-idle state.

In block 440, the computing device 100 begins assigning threads to the requested online set of processor cores 122. For example, the scheduler 316 of the operating system 302 may resume assigning new threads to the processor cores 122 in the requested online set. Additionally, the computing device 100 may allow certain interrupts such as inter-processor interrupts (IPIs), translation looksaside buffer (TLB) flushes, or other interrupts to be handled by the processor cores 122 of the requested online set. After resuming assignment of threads to the requested online set of processor cores 122, the method 400 loops back to block 410, shown in FIG. 4A, to continue monitoring for platform management events.

It should be appreciated that, in some embodiments, the method 400 may be embodied as various instructions stored on a computer-readable media, which may be executed by the processor 120, the I/O subsystem 124, and/or other components of the computing device 100 to cause the computing device 100 to perform the method 400. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for processor core offlining, the computing device comprising: a configuration module to query a firmware interface of the computing device to retrieve a first set of processor cores of the computing device, wherein each of the first set of processor cores is a potential target to soft-offline; an interrupt management module to prevent receipt of device interrupts by the processor cores of the first set of processor cores; and a core management module to (i) detect, in response to prevention of receipt of device interrupts by the processor cores of the first set of processor cores, a platform management event from the firmware interface and (ii) query the firmware interface to determine a second set of processor cores to bring offline in response to detection of the platform management event, wherein the second set of processor cores is included in the first set of processor cores.

Example 2 includes the subject matter of Examples 1, and wherein to query the firmware interface of the computing device to retrieve the first set of processor cores of the computing device comprises to evaluate an object of a firmware namespace established by the firmware environment of the computing device.

Example 3 includes the subject matter of any of Examples 1 and 2, and wherein to evaluate the object of the firmware namespace comprises to interpret a control method for a virtual machine with a bytecode interpreter of the computing device.

Example 4 includes the subject matter of any of Examples 1-3, and wherein to query the firmware interface to determine the second set of processor cores to bring offline comprises to evaluate an object of a firmware namespace established by the firmware environment of the computing device.

Example 5 includes the subject matter of any of Examples 1-4, and wherein to evaluate the object of the firmware namespace comprises to interpret a control method for a virtual machine with a bytecode interpreter of the computing device.

Example 6 includes the subject matter of any of Examples 1-5, and wherein the platform management event comprises a memory hot-plug event.

Example 7 includes the subject matter of any of Examples 1-6, and wherein the platform management event comprises a specialized workload event.

Example 8 includes the subject matter of any of Examples 1-7, and wherein to detect the platform management event from the firmware interface comprises to handle a system control interrupt generated by the firmware interface.

Example 9 includes the subject matter of any of Examples 1-8, and wherein to prevent the receipt of device interrupts by the processor cores of the first set comprises to exclude the first set of processor cores from an interrupt affinity mask for device interrupts.

Example 10 includes the subject matter of any of Examples 1-9, and further comprising: a scheduler module to re-assign any threads from the second set of processor cores to one or more processor cores of the computing device not in the second set of processor cores; wherein the core management module is further to bring the second set of processor cores into a low-power state in response to re-assignment of any threads; and wherein the interrupt management module is further to prevent interrupts to the second set of processor cores in response to bringing of the second set of processor cores into the low-power state.

Example 11 includes the subject matter of any of Examples 1-10, and wherein the core management module is further to notify the firmware interface with the second set of processor cores in response to bringing of the second set of processor cores into the low-power state.

Example 12 includes the subject matter of any of Examples 1-11, and further comprising a platform management module to perform a platform management operation in response to notification of the firmware interface with the second set of processor cores.

Example 13 includes the subject matter of any of Examples 1-12, and wherein to perform the platform management operation comprises to enter, by each processor core of the second set of processor cores, a system management mode.

Example 14 includes the subject matter of any of Examples 1-13, and wherein to perform the platform management operation comprises to perform a specialized workload while the second set of processor cores are in the low-power state.

Example 15 includes the subject matter of any of Examples 1-14, and wherein to perform the specialized workload comprises to activate a non-core resource of a processor of the computing device.

Example 16 includes the subject matter of any of Examples 1-15, and wherein the core management module is further to: notify, by the firmware interface of the computing device, an operating system of the computing device in response to performance of the platform management operation to indicate that the platform management operation is completed; query the firmware interface to determine a third set of processor cores to bring online in response to notification of the operating system, wherein the third set of processor cores is included in the first set of processor cores; and bring the third set of processor cores into a normal power state.

Example 17 includes the subject matter of any of Examples 1-16, and wherein the second set of processor cores comprises the third set of processor cores.

Example 18 includes the subject matter of any of Examples 1-17, and wherein to query the firmware interface to determine the third set of processor cores to bring online comprises to evaluate an object of a firmware namespace established by the firmware environment of the computing device.

Example 19 includes the subject matter of any of Examples 1-18, and wherein to evaluate the object of the firmware namespace comprises to interpret a control method for a virtual machine with a bytecode interpreter of the computing device.

Example 20 includes the subject matter of any of Examples 1-19, and wherein the scheduler module is further to assign a thread to a processor core of the third set of processor cores in response to bringing of the third set of processor cores into the normal power state.

Example 21 includes a method for processor core offlining, the method comprising: querying, by a computing device, a firmware interface of the computing device to retrieve a first set of processor cores of the computing device, wherein each of the first set of processor cores is a potential target for soft-offlining; preventing, by the computing device, the processor cores of the first set of processor cores from receiving device interrupts; detecting, by the computing device in response to preventing the processor cores of the first set of the processor cores from receiving device interrupts, a platform management event from the firmware interface; and querying, by the computing device, the firmware interface to determine a second set of processor cores to bring offline in response to detecting the platform management event, wherein the second set of processor cores is included in the first set of processor cores.

Example 22 includes the subject matter of Example 21, and wherein querying the firmware interface of the computing device to retrieve the first set of processor cores of the computing device comprises evaluating an object of a firmware namespace established by the firmware environment of the computing device.

Example 23 includes the subject matter of any of Examples 21 and 22, and wherein evaluating the object of the firmware namespace comprises interpreting a control method for a virtual machine with a bytecode interpreter of the computing device.

Example 24 includes the subject matter of any of Examples 21-23, and wherein querying the firmware interface to determine the second set of processor cores to bring offline comprises evaluating an object of a firmware namespace established by the firmware environment of the computing device.

Example 25 includes the subject matter of any of Examples 21-24, and wherein evaluating the object of the firmware namespace comprises interpreting a control method for a virtual machine with a bytecode interpreter of the computing device.

Example 26 includes the subject matter of any of Examples 21-25, and wherein detecting the platform management event from the firmware interface comprises detecting a memory hot-plug event.

Example 27 includes the subject matter of any of Examples 21-26, and wherein detecting the platform management event from the firmware interface comprises detecting a specialized workload event.

Example 28 includes the subject matter of any of Examples 21-27, and wherein detecting the platform management event from the firmware interface comprises handling a system control interrupt generated by the firmware interface.

Example 29 includes the subject matter of any of Examples 21-28, and wherein preventing the first set of processor cores from receiving device interrupts comprises excluding the first set of processor cores from an interrupt affinity mask for device interrupts.

Example 30 includes the subject matter of any of Examples 21-29, and further comprising: re-assigning, by the computing device, any threads from the second set of processor cores to one or more processor cores of the computing device not in the second set of processor cores; bringing, by the computing device, the second set of processor cores into a low-power state in response to re-assigning any threads; and preventing, by the computing device, interrupts to the second set of processor cores in response to bringing the second set of processor cores into the low-power state.

Example 31 includes the subject matter of any of Examples 21-30, and further comprising notifying, by the computing device, the firmware interface with the second set of processor cores in response to bringing the second set of processor cores into the low-power state.

Example 32 includes the subject matter of any of Examples 21-31, and further comprising performing, by the computing device, a platform management operation in response to notifying the firmware interface with the second set of processor cores.

Example 33 includes the subject matter of any of Examples 21-32, and wherein performing the platform management operation comprises entering, by each processor core of the second set of processor cores, a system management mode.

Example 34 includes the subject matter of any of Examples 21-33, and wherein performing the platform management operation comprises performing a specialized workload while the second set of processor cores are in the low-power state.

Example 35 includes the subject matter of any of Examples 21-34, and wherein performing the specialized workload comprises activating a non-core resource of a processor of the computing device.

Example 36 includes the subject matter of any of Examples 21-35, and further comprising: notifying, by the firmware interface of the computing device, an operating system of the computing device in response to performing the platform management operation to indicate that the platform management operation is completed; querying, by the computing device, the firmware interface to determine a third set of processor cores to bring online in response to notifying the operating system, wherein the third set of processor cores is included in the first set of processor cores; and bringing, by the computing device, the third set of processor cores into a normal power state.

Example 37 includes the subject matter of any of Examples 21-36, and wherein the second set of processor cores comprises the third set of processor cores.

Example 38 includes the subject matter of any of Examples 21-37, and wherein querying the firmware interface to determine the third set of processor cores to bring online comprises evaluating an object of a firmware namespace established by the firmware environment of the computing device.

Example 39 includes the subject matter of any of Examples 21-38, and wherein evaluating the object of the firmware namespace comprises interpreting a control method for a virtual machine with a bytecode interpreter of the computing device.

Example 40 includes the subject matter of any of Examples 21-39, and further comprising assigning, by the computing device, a thread to a processor core of the third set of processor cores in response to bringing the third set of processor cores into the normal power state.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for processor core offlining, the computing device comprising: means for querying a firmware interface of the computing device to retrieve a first set of processor cores of the computing device, wherein each of the first set of processor cores is a potential target for soft-offlining; means for preventing the processor cores of the first set of processor cores from receiving device interrupts; means for detecting, in response to preventing the processor cores of the first set of the processor cores from receiving device interrupts, a platform management event from the firmware interface; and means for querying the firmware interface to determine a second set of processor cores to bring offline in response to detecting the platform management event, wherein the second set of processor cores is included in the first set of processor cores.

Example 45 includes the subject matter of Example 44, and wherein the means for querying the firmware interface of the computing device to retrieve the first set of processor cores of the computing device comprises means for evaluating an object of a firmware namespace established by the firmware environment of the computing device.

Example 46 includes the subject matter of any of Examples 44 and 45, and wherein the means for evaluating the object of the firmware namespace comprises means for interpreting a control method for a virtual machine with a bytecode interpreter of the computing device.

Example 47 includes the subject matter of any of Examples 44-46, and wherein the means for querying the firmware interface to determine the second set of processor cores to bring offline comprises means for evaluating an object of a firmware namespace established by the firmware environment of the computing device.

Example 48 includes the subject matter of any of Examples 44-47, and wherein the means for evaluating the object of the firmware namespace comprises means for interpreting a control method for a virtual machine with a bytecode interpreter of the computing device.

Example 49 includes the subject matter of any of Examples 44-48, and wherein the means for detecting the platform management event from the firmware interface comprises means for detecting a memory hot-plug event.

Example 50 includes the subject matter of any of Examples 44-49, and wherein the means for detecting the platform management event from the firmware interface comprises means for detecting a specialized workload event.

Example 51 includes the subject matter of any of Examples 44-50, and wherein the means for detecting the platform management event from the firmware interface comprises means for handling a system control interrupt generated by the firmware interface.

Example 52 includes the subject matter of any of Examples 44-51, and wherein the means for preventing the first set of processor cores from receiving device interrupts comprises means for excluding the first set of processor cores from an interrupt affinity mask for device interrupts.

Example 53 includes the subject matter of any of Examples 44-52, and further comprising: means for re-assigning any threads from the second set of processor cores to one or more processor cores of the computing device not in the second set of processor cores; means for bringing the second set of processor cores into a low-power state in response to re-assigning any threads; and means for preventing interrupts to the second set of processor cores in response to bringing the second set of processor cores into the low-power state.

Example 54 includes the subject matter of any of Examples 44-53, and further comprising means for notifying the firmware interface with the second set of processor cores in response to bringing the second set of processor cores into the low-power state.

Example 55 includes the subject matter of any of Examples 44-54, and further comprising means for performing a platform management operation in response to notifying the firmware interface with the second set of processor cores.

Example 56 includes the subject matter of any of Examples 44-55, and wherein the means for performing the platform management operation comprises means for entering, by each processor core of the second set of processor cores, a system management mode.

Example 57 includes the subject matter of any of Examples 44-56, and wherein the means for performing the platform management operation comprises means for performing a specialized workload while the second set of processor cores are in the low-power state.

Example 58 includes the subject matter of any of Examples 44-57, and wherein the means for performing the specialized workload comprises means for activating a non-core resource of a processor of the computing device.

Example 59 includes the subject matter of any of Examples 44-58, and further comprising: means for notifying, by the firmware interface of the computing device, an operating system of the computing device in response to performing the platform management operation to indicate that the platform management operation is completed; means for querying the firmware interface to determine a third set of processor cores to bring online in response to notifying the operating system, wherein the third set of processor cores is included in the first set of processor cores; and means for bringing the third set of processor cores into a normal power state.

Example 60 includes the subject matter of any of Examples 44-59, and wherein the second set of processor cores comprises the third set of processor cores.

Example 61 includes the subject matter of any of Examples 44-60, and wherein the means for querying the firmware interface to determine the third set of processor cores to bring online comprises means for evaluating an object of a firmware namespace established by the firmware environment of the computing device.

Example 62 includes the subject matter of any of Examples 44-61, and wherein the means for evaluating the object of the firmware namespace comprises means for interpreting a control method for a virtual machine with a bytecode interpreter of the computing device.

Example 63 includes the subject matter of any of Examples 44-62, and further comprising means for assigning a thread to a processor core of the third set of processor cores in response to bringing the third set of processor cores into the normal power state.

The invention claimed is:

1. A computing device for processor core offlining, the computing device comprising:

a configuration module to query a firmware interface of the computing device to retrieve a first set of processor cores of the computing device, wherein each of the first set of processor cores is a potential target to soft-offline;

an interrupt management module to prevent receipt of device interrupts by the processor cores of the first set of processor cores, wherein each device interrupt is generated by an I/O device;

a core management module to (i) detect, in response to prevention of receipt of device interrupts by the processor cores of the first set of processor cores, a platform management event from the firmware interface and (ii) query the firmware interface to determine a second set of processor cores to bring offline in response to detection of the platform management event, wherein the second set of processor cores is included in the first set of processor cores; and a scheduler module to re-assign any threads from the second set of processor cores to one or more processor cores of the computing device not in the second set of processor cores in response to the detection of the platform management event;

wherein the interrupt management module is further to prevent interrupts other than device interrupts to the second set of processor cores in response to prevention of receipt of device interrupts by the processor cores of the first set of processor cores and in response to re-assignment of any threads from the second set of processor cores, wherein each interrupt other than device interrupts is not generated by an I/O device;

wherein the computing device further comprises a platform management module to activate a non-core resource of a processor of the computing device in response to prevention of interrupts other than device interrupts to the second set of processor cores.

2. The computing device of claim 1, wherein to query the firmware interface of the computing device to retrieve the first set of processor cores of the computing device comprises to evaluate an object of a firmware namespace established by the firmware environment of the computing device.

3. The computing device of claim 2, wherein to evaluate the object of the firmware namespace comprises to interpret a control method for a virtual machine with a bytecode interpreter of the computing device.

4. The computing device of claim 1, wherein to query the firmware interface to determine the second set of processor cores to bring offline comprises to evaluate an object of a firmware namespace established by the firmware environment of the computing device.

5. The computing device of claim 1, wherein the platform management event comprises a memory hot-plug event.

6. The computing device of claim 1, wherein the platform management event comprises a specialized workload event.

7. The computing device of claim 1, wherein the core management module is further to (i) bring the second set of processor cores into a low-power state in response to the re-assignment of any threads and (ii) notify the firmware interface with the second set of processor cores in response to bringing of the second set of processor cores into the low-power state; and wherein the interrupt management module is further to prevent interrupts to the second set of processor cores in response to bringing of the second set of processor cores into the low-power state.

8. The computing device of claim 7, wherein the platform management module is further to perform a platform management operation in response to notification of the firmware interface with the second set of processor cores.

9. The computing device of claim 8, wherein to perform the platform management operation comprises to enter, by each processor core of the second set of processor cores, a system management mode.

10. The computing device of claim 8, wherein to perform the platform management operation comprises to perform a specialized workload while the second set of processor cores are in the low-power state.

11. The computing device of claim 10, wherein to perform the specialized workload comprises to activate the non-core resource of a processor of the computing device, wherein the non-core resource comprises a field programmable gate array (FPGA).

12. The computing device of claim 8, wherein the core management module is further to:

notify, by the firmware interface of the computing device, an operating system of the computing device in response to performance of the platform management operation to indicate that the platform management operation is completed;

query the firmware interface to determine a third set of processor cores to bring online in response to notification of the operating system, wherein the third set of processor cores is included in the first set of processor cores; and bring the third set of processor cores into a normal power state.

13. The computing device of claim 12, wherein to query the firmware interface to determine the third set of processor cores to bring online comprises to evaluate an object of a firmware namespace established by the firmware environment of the computing device.

14. A method for processor core offlining, the method comprising:

querying, by a computing device, a firmware interface of the computing device to retrieve a first set of processor cores of the computing device, wherein each of the first set of processor cores is a potential target for soft-offlining;

preventing, by the computing device, the processor cores of the first set of processor cores from receiving device interrupts, wherein each device interrupt is generated by an I/O device;

detecting, by the computing device in response to preventing the processor cores of the first set of the processor cores from receiving device interrupts, a platform management event from the firmware interface;

querying, by the computing device, the firmware interface to determine a second set of processor cores to bring offline in response to detecting the platform management event, wherein the second set of processor cores is included in the first set of processor cores;

re-assigning, by the computing device, any threads from the second set of processor cores to one or more processor cores of the computing device not in the second set of processor cores in response to detecting the platform management event;

preventing, by the computing device, interrupts other than device interrupts to the second set of processor cores in response to preventing the processor cores of the first set of the processor cores from receiving device interrupts and in response to re-assigning any threads from the second set of processor cores, wherein each interrupt other than device interrupts is not generated by an I/O device; and activating, by the computing device, a non-core resource of a processor of the computing device in response to preventing interrupts other than device interrupts to the second set of processor cores.

15. The method of claim 14, further comprising:

bringing, by the computing device, the second set of processor cores into a low-power state in response to re-assigning any threads; and notifying, by the computing device, the firmware interface with the second set of processor cores in response to bringing the second set of processor cores into the low-power state;

wherein preventing the interrupts other than device interrupts to the second set of processor cores further comprises preventing interrupts to the second set of processor cores in response to bringing the second set of processor cores into the low-power state.

16. The method of claim 15, further comprising performing, by the computing device, a platform management operation in response to notifying the firmware interface with the second set of processor cores.

17. The method of claim 16, wherein performing the platform management operation comprises entering, by each processor core of the second set of processor cores, a system management mode.

18. The method of claim 16, wherein performing the platform management operation comprises performing a specialized workload while the second set of processor cores are in the low-power state, wherein performing the specialized workload comprises activating the non-core resource.

19. The method of claim 16, further comprising:

notifying, by the firmware interface of the computing device, an operating system of the computing device in response to performing the platform management operation to indicate that the platform management operation is completed;

querying, by the computing device, the firmware interface to determine a third set of processor cores to bring online in response to notifying the operating system, wherein the third set of processor cores is included in the first set of processor cores; and bringing, by the computing device, the third set of processor cores into a normal power state.

20. One or more computer-readable storage media comprising a plurality of instructions that in response to being executed cause a computing device to:

query a firmware interface of the computing device to retrieve a first set of processor cores of the computing device, wherein each of the first set of processor cores is a potential target for soft-offlining;

prevent the processor cores of the first set of processor cores from receiving device interrupts, wherein each device interrupt is generated by an I/O device;

detect, in response to preventing the processor cores of the first set of the processor cores from receiving device interrupts, a platform management event from the firmware interface;

query the firmware interface to determine a second set of processor cores to bring offline in response to detecting the platform management event, wherein the second set of processor cores is included in the first set of processor cores;

re-assign any threads from the second set of processor cores to one or more processor cores of the computing device not in the second set of processor cores in response to detecting the platform management event;

prevent interrupts other than device interrupts to the second set of processor cores in response to preventing the processor cores of the first set of the processor cores from receiving device interrupts and in response to re-assigning any threads from the second set of processor cores, wherein each interrupt other than device interrupts is not generated by an I/O device; and activate a non-core resource of a processor of the computing device in response to preventing interrupts other than device interrupts to the second set of processor cores.

21. The one or more computer-readable storage media of claim 20, further comprising a plurality of instructions that in response to being executed cause the computing device to:

bring the second set of processor cores into a low-power state in response to re-assigning any threads; and notify the firmware interface with the second set of processor cores in response to bringing the second set of processor cores into the low-power state;

wherein to prevent the interrupts other than device interrupts to the second set of processor cores further comprises to prevent interrupts to the second set of processor cores in response to bringing the second set of processor cores into the low-power state.

22. The one or more computer-readable storage media of claim 21, further comprising a plurality of instructions that in response to being executed cause the computing device to perform a platform management operation in response to notifying the firmware interface with the second set of processor cores.

23. The one or more computer-readable storage media of claim 22, wherein to perform the platform management operation comprises to enter, by each processor core of the second set of processor cores, a system management mode.

24. The one or more computer-readable storage media of claim 22, wherein to perform the platform management operation comprises to perform a specialized workload while the second set of processor cores are in the low-power state, wherein to perform the specialized workload comprises to activate the non-core resource.

25. The one or more computer-readable storage media of claim 22, further comprising a plurality of instructions that in response to being executed cause the computing device to:

notify, by the firmware interface of the computing device, an operating system of the computing device in response to performing the platform management operation to indicate that the platform management operation is completed;

query the firmware interface to determine a third set of processor cores to bring online in response to notifying the operating system, wherein the third set of processor cores is included in the first set of processor cores; and bring the third set of processor cores into a normal power state.

* * * * *